United States Patent
Shigeno et al.

(10) Patent No.: US 10,151,773 B2
(45) Date of Patent: Dec. 11, 2018

(54) SCANNING PROBE MICROSCOPE AND PROBE CONTACT DETECTION METHOD (71) Applicant: HITACHI HIGH-TECH SCIENCE CORPORATION, Tokyo (JP)

(72) Inventors: Masatsugu Shigeno, Tokyo (JP); Kazutoshi Watanabe, Tokyo (JP); Masafumi Watanabe, Tokyo (JP); Hiroyoshi Yamamoto, Tokyo (JP); Kazuo Chinone, Tokyo (JP)

(73) Assignee: Hitachi High-Tech Science Corporation, Tokyo (JP)

( * ) Notice: Subject to any disclaimer, the term of this patent is extended or adjusted under 35 U.S.C. 154(b) by 0 days.

(21) Appl. No.: 15/468,668

(22) Filed: Mar. 24, 2017

(65) Prior Publication Data

US 2017/0285067 A1    Oct. 5, 2017

(30) Foreign Application Priority Data

Mar. 29, 2016    (JP) .................................. 2016-065007

(51) Int. Cl.
*G01Q 60/26*    (2010.01)
*G01Q 10/04*    (2010.01)
(Continued)

(52) U.S. Cl.
CPC .......... *G01Q 10/02* (2013.01); *G01Q 10/065* (2013.01)

(58) Field of Classification Search
CPC ...... G01Q 10/065; G01Q 10/00; G01Q 10/04; G01Q 60/26; G01Q 60/28; G01Q 60/363; G01N 19/02; G01N 19/04; Y10S 977/863
(Continued)

(56) References Cited

U.S. PATENT DOCUMENTS 5,386,720 A * 2/1995 Toda ...................... B82Y 35/00
                                                    250/307
5,444,244 A * 8/1995 Kirk ...................... B82Y 35/00
                                                    850/9
(Continued)

FOREIGN PATENT DOCUMENTS

JP    H0727560 A    1/1995
JP    H07181028 A    7/1995
(Continued)

OTHER PUBLICATIONS

European Search Report for related application EP17162737 dated Aug. 1, 2017, 2 pgs.
(Continued)

*Primary Examiner* — David A Vanore
(74) *Attorney, Agent, or Firm* — Stinson Leonard Street LLP (57) ABSTRACT

According to this invention, a scanning probe microscope for scanning a surface of a sample with a probe by bringing the probe into contact with the surface of the sample, comprises a cantilever having the probe at its tip; a displacement detection unit to detect both a bending amount and a torsion amount of the cantilever; and a contact determination unit to determine a primary contact of the probe with the surface of the sample, based on the bending amount and the torsion amount detected by the displacement detection unit in all directions from an undeformed condition of the cantilever.

4 Claims, 8 Drawing Sheets (51) Int. Cl.
*G01Q 10/02* (2010.01)
*G01Q 10/06* (2010.01)

(58) Field of Classification Search
USPC .................. 977/852, 863; 850/5, 3, 33, 1, 9
See application file for complete search history.

(56) References Cited

U.S. PATENT DOCUMENTS

| | | | | |
|---|---|---|---|---|
| 5,700,953 A * | 12/1997 | Hlady | ................... | G01N 3/38 |
| | | | | 73/105 |
| 5,959,957 A * | 9/1999 | Ikeda | ................... | G11B 9/1409 |
| | | | | 369/126 |
| 6,176,122 B1 * | 1/2001 | Shimizu | ................ | B82Y 35/00 |
| | | | | 73/105 |
| 6,349,591 B1 * | 2/2002 | Fretigny | ................ | B82Y 35/00 |
| | | | | 73/105 |
| 6,448,766 B1 * | 9/2002 | Berger | ................... | B82Y 35/00 |
| | | | | 324/212 |
| 6,567,715 B1 * | 5/2003 | Sinclair | ................ | B81C 99/005 |
| | | | | 257/48 |
| 6,880,386 B1 * | 4/2005 | Krotil | ................... | B82Y 35/00 |
| | | | | 73/105 |
| 6,945,099 B1 * | 9/2005 | Su | ......................... | G01Q 60/26 |
| | | | | 73/105 |
| 7,060,448 B2 * | 6/2006 | Henderson | ........... | C07K 16/065 |
| | | | | 356/501 |
| 2003/0185967 A1 * | 10/2003 | Eby | ........................ | G01Q 40/00 |
| | | | | 427/8 |
| 2005/0028583 A1 * | 2/2005 | Su | ......................... | B82Y 35/00 |
| | | | | 73/105 |
| 2006/0000263 A1 * | 1/2006 | Su | ......................... | B82Y 35/00 |
| | | | | 73/105 |
| 2006/0005614 A1 * | 1/2006 | Sahin | ................... | B82Y 35/00 |
| | | | | 73/105 |
| 2007/0137740 A1 * | 6/2007 | Johnson | ............... | A61L 31/022 |
| | | | | 148/562 |
| 2008/0022759 A1 * | 1/2008 | Su | ......................... | B82Y 35/00 |
| | | | | 73/105 |
| 2008/0087820 A1 * | 4/2008 | Kurenuma | ............. | B82Y 35/00 |
| | | | | 250/307 |
| 2009/0027690 A1 * | 1/2009 | Fukuzawa | ............. | B82Y 35/00 |
| | | | | 356/600 |
| 2009/0158828 A1 * | 6/2009 | Baba | ..................... | G01Q 60/28 |
| | | | | 73/105 |
| 2010/0115674 A1 * | 5/2010 | Fujimoto | ............. | G01Q 60/363 |
| | | | | 850/33 |
| 2010/0175155 A1 * | 7/2010 | Sahin | ................... | B82Y 35/00 |
| | | | | 850/6 |
| 2010/0205697 A1 * | 8/2010 | Iyoki | .................... | G01Q 10/06 |
| | | | | 850/1 |
| 2011/0271412 A1 * | 11/2011 | Rychen | ................. | B82Y 35/00 |
| | | | | 850/21 |
| 2012/0227139 A1 * | 9/2012 | Yasutake | ............... | B82Y 35/00 |
| | | | | 850/5 |
| 2013/0205454 A1 | 8/2013 | Baba et al. | | |
| 2014/0026263 A1 * | 1/2014 | Humphris | ............. | G01Q 10/04 |
| | | | | 850/3 |
| 2016/0161396 A1 * | 6/2016 | Park | ...................... | G01N 19/02 |
| | | | | 73/9 |
| 2016/0231656 A1 * | 8/2016 | Holzner | ............... | G03F 7/0002 |

FOREIGN PATENT DOCUMENTS

| | | |
|---|---|---|
| JP | H07248334 A | 9/1995 |
| JP | 10-062158 A | 6/1998 |
| JP | 2001-33373 A | 9/2001 |
| JP | 2007-85764 A | 5/2007 |

OTHER PUBLICATIONS

European Patent Office Communication for related application EP17162737 dated Aug. 17, 2017, 5 pgs.

* cited by examiner

SCANNING PROBE MICROSCOPE AND PROBE CONTACT DETECTION METHOD

CROSS-REFERENCE TO RELATED APPLICATION

This application claims priority from Japanese Patent Application No. 2016-065007, filed on Mar. 29, 2016, the entire subject matter of which is incorporated herein by reference.

BACKGROUND

1. Field of the Invention

The present invention relates to a scanning probe microscope and probe contact sensing method thereof.

2. Description of Related Art

Conventionally, a scanning probe microscope for measuring an uneven (concave-convex) shape of a sample surface by continuously scanning a probe on the sample surface while maintaining the interaction between the probe formed at the tip of the cantilever and the sample (e.g., amplitude of the cantilever or bending of the cantilever) constant is known (see Patent Document 1). However, in the scanning probe microscope described in Patent Document 1, because the probe and the sample are always in contact, there is a possibility that wear of the probe or damage of the sample occurs.

In contrast, in Patent Documents 2 and 3, an intermittent measurement method for measuring the uneven shape of the sample surface by bringing the probe into contact with the sample surface only on a plurality of predetermined measurement points and by intermittently scanning the sample surface has been proposed. In this method, when a force (bending) applied to the cantilever becomes a certain value or more, it is determined that the probe and the sample surface are in contact, and then the height of the probe when the probe is in contact with the sample is measured. Thus, compared to Patent Document 1, the intermittent measurement method requires a minimum of contact by bringing the probe into contact with the sample surface only on the measurement points, thereby reducing wear of the probe or damage of the sample.

PRIOR ART DOCUMENTS

[Patent Document 1] Japanese Unexamined Patent Publication No. 1998-62158
[Patent Document 2] Japanese Unexamined Patent Publication No. 2001-33373
[Patent Document 3] Japanese Unexamined Patent Publication No. 2007-85764

SUMMARY OF THE INVENTION

However, the bending of the cantilever is affected by the shape of the sample surface to be pressed in addition to the force with which the probe presses against the sample surface (hereinafter, referred to as "pressing force"). For example, if the sample surface which the probe is contacted is an inclined plane, for the bending of the cantilever to be equal to or higher than a predetermined value, there are cases where a greater pressing force is required, compared to a horizontal plane. Thus, if the sample surface which is a measurement point is the inclined plane, there are cases where the value of the pressing force to detect the contact between the probe and the sample surface changes as compared to the horizontal plane. Accordingly, there are cases where along with some error occurring in the shape measurement of the inclined plane of the sample surface, wear of the probe and deformation of the sample can be caused. Such a problem is not limited to the intermittent measurement method, but common to measurement methods having the step of bringing a probe into contact with a sample surface.

The present invention has been made in view of these circumstances, and its object is to provide a scanning probe microscope and a probe contact detection method which are capable of improving the amount of change in the force value occurring if the sample surface which the probe is contacted is an inclined plane, by using torsion as well as bending as deformation of the cantilever to detect the contact between the probe and the sample surface and then by using all directions of the upper and lower bending and the left and right torsion from the non-deformation as respective deformation directions.

One aspect of the present invention provides a scanning probe microscope for scanning a surface of a sample with a probe by bringing the probe into contact with the surface of the sample, comprising a cantilever having the probe at its tip; a displacement detection unit to detect both a bending amount and a torsion amount of the cantilever; and a contact determination unit to determine a primary contact of the probe with the surface of the sample, based on the bending amount and the torsion amount detected by the displacement detection unit in all directions from an undeformed condition of the cantilever.

Further, another aspect of the present invention provides the scanning probe microscope described above, wherein the contact determination unit determines that the probe has been brought into contact with the surface of the sample when at least one of the bending amount and the torsion amount exceeds a predetermined range.

Further, another aspect of the present invention provides the scanning probe microscope described above, further comprising a measuring unit to measure a relative distance that is a distance by which one of the probe and the surface of the sample is forced to move relative to the other when they are forced to bring into contact with each other.

Further, another aspect of the present invention provides the scanning probe microscope described above, further comprising a movement driving unit to move the probe backwards in a direction away from the sample and to move it to a next measurement position of the sample after the relative distance has been measured by the measuring unit.

Further, another aspect of the present invention provides the scanning probe microscope described above, further comprising a calculation unit to calculate a distance by which the probe is moved backwards in the direction away from the sample, based on the bending amount and the torsion amount.

Further, another aspect of the present invention provides the scanning probe microscope described above, wherein the movement driving unit, after said backward movement, moves the probe to a before-lowering position for measurement which is positioned directly above the next measurement position and which is not brought into contact with the probe and lowers the probe from the before-lowering position for measurement to the next measurement position.

Further, another aspect of the present invention provides the scanning probe microscope described above, further comprising a movement driving unit for scanning with the probe, wherein the movement driving unit is configured to control one of the bending amount and the torsion amount detected by the displacement detection unit to be maintained within boundary values, and to control the other amount to be maintained within the predetermined range.

Further, another aspect of the present invention provides a method of detecting a probe contact of a scanning probe microscope for scanning a surface of a sample with a probe by bringing the probe into contact with the surface of the sample, comprising a displacement detection step of detecting both a bending amount and a torsion amount of a cantilever having the probe at its tip; and a contact determination step of determining a primary contact of the probe with the surface of the sample, based on the bending amount and the torsion amount detected by the displacement detection step in all directions from an undeformed condition of the cantilever.

As described above, according to the present invention, it can provide a scanning probe microscope and a probe contact detection method which are capable of improving a phenomenon that when the surface of the sample with which the probe is in contact is an inclined plane, the value of the pressing force to detect the contact between the probe and the surface of the sample is changed as compared to the horizontal plane.

DETAILED DESCRIPTION OF EMBODIMENTS

Hereinafter, the present invention will be described through embodiments of the present invention, but the following embodiments do not limit the invention related to the claims. In addition, not all combinations of features described in the embodiments are necessarily essential to solving means of the invention. In the drawings, there are cases where the same or similar parts are denoted by the same reference numerals, omitting their redundant descriptions.

The scanning probe microscope according to embodiments determines whether the probe is in contact with the sample surface or not, based on the bending amount and torsion amount of the probe by contacting the probe on the sample surface and scanning the sample surface. Hereinafter, the scanning probe microscope according to the embodiment will be described with reference to the drawings.

Figure 1:
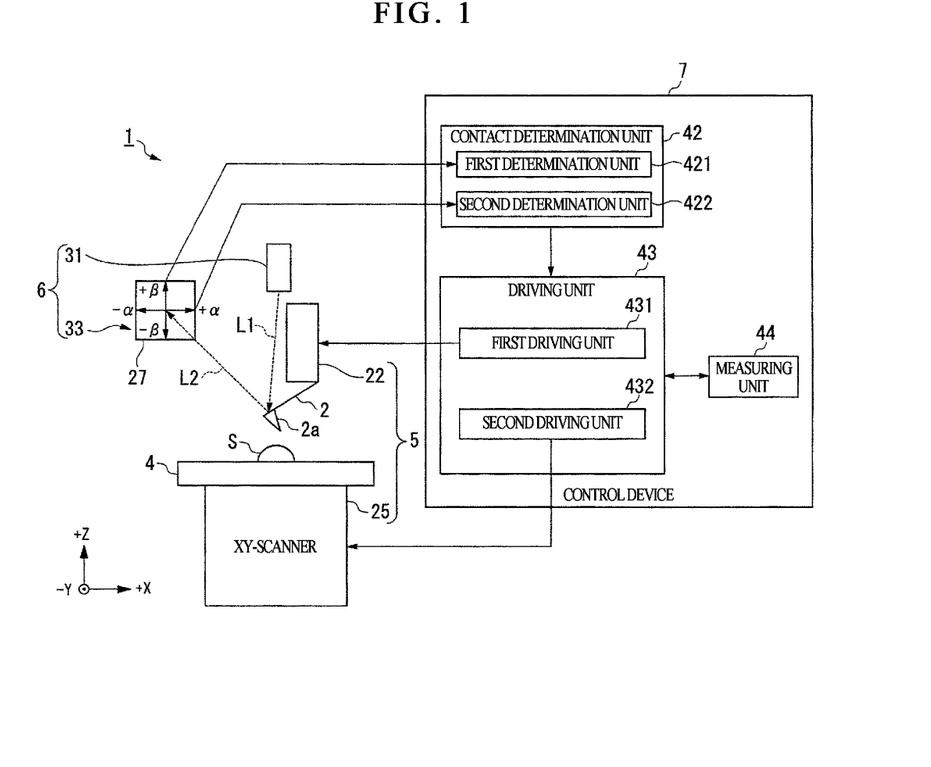
FIG. 1 shows an example of a schematic configuration of a scanning probe microscope 1 according to the present embodiment.

FIG. 1 shows an example of a schematic configuration of a scanning probe microscope 1 of the present embodiment. As shown in FIG. 1, the scanning probe microscope 1 comprises a cantilever 2, a sample stage 4, a movement driving unit 5, a displacement detection unit 6 and a control device 7.

The cantilever 2 is provided with a probe 2a at its tip. The basal end of the cantilever 2 is fixed, and the distal end thereof is a free end. The cantilever 2 is an elastic lever member having a small spring constant K, and when the probe 2a of the tip and the surface of the sample S are brought into contact, bending occurs in accordance with the pressing force with which the probe 2a of the tip presses the surface of the sample S.

Further, in the cantilever 2, when the probe 2a of the tip and the surface of the sample S are brought into contact and there is an inclination on the surface of the sample S, torsion or bending occurs according to the inclination and the fulcrum reaction force of the fulcrum which is a contact point of the probe 2a of the tip with the surface of the sample S. One of features of the scanning probe microscope 1 according to this embodiment is to detect the contact between the probe 2a of the tip and the surface of the sample S, based on the bending and torsion of the cantilever 2 caused by the contact between the probe 2a of the tip and the surface of the sample S.

The movement driving unit 5 includes a Z-direction driving device 22 and a XY-scanner 25.

The Z-direction driving device 22 has the cantilever 2 mounted at its lower end, and moves the cantilever 2 in the direction (Z-direction) perpendicular to the horizontal plane. For example, the Z-direction driving device 22 is a piezoelectric element. The Z-direction driving device 22 brings the cantilever 2 closer to the surface of the sample S based on a first drive signal outputted from the control device 7 and retracts (or withdraws) the cantilever 2 from the surface of the sample S. However, the Z-direction driving device 22 and the XY-scanner 25 may be arranged in any arrangement as long as it is possible to relatively scan the three-dimensional shape observation, such as an arrangement integrally formed on the sample side, an arrangement integrally formed on the cantilever side, etc.

The sample stage 4 is mounted on the XY-scanner 25. The sample S is placed on the sample stage 4 so as to face the probe 2a of the cantilever 2. When a second drive signal is outputted from the control device 7, the XY-scanner 25 moves the probe 2*a* and the sample S relative to XY-directions in accordance with the voltage value and the polarity of the second driving signal. Further, a plane parallel to the surface of the sample stage 4 in FIG. 1 is a horizontal plane, which is defined herein as a XY-plane by two axes X, Y which are orthogonal to each other.

The displacement detection unit 6 detects the amount of bending and the amount of torsion of the cantilever 2. In the present embodiment, description will be given on a case wherein the displacement detection unit 6 detects the amount of bending and the amount of torsion of the cantilever 2 by use of an optical lever method.

The displacement detection unit 6 includes a light irradiation unit 31 and a light detection unit 33.

The light irradiation section 31 irradiates a laser light L1 with respect to the reflecting surface (not shown) formed on the back surface of the cantilever 2.

The light detection unit 33 receives a laser light L2 reflected by the reflecting surface. The light detection unit 33 is an optical detector having a quartered light receiving surface 27 for receiving the laser light L2 reflected by the back surface.

That is, the optical path is adjusted in order that the laser light L2 reflected by the back surface of the cantilever 2 is to be incident on the quartered light receiving surface 27 of the light detection unit 33 (usually, near the center of the light receiving surface 27). Hereinafter, a method for detecting the amount of the bending and the amount of torsion of the cantilever 2 in the present embodiment will be described with reference to FIG. 1 and FIG. 2.

Figure 2:
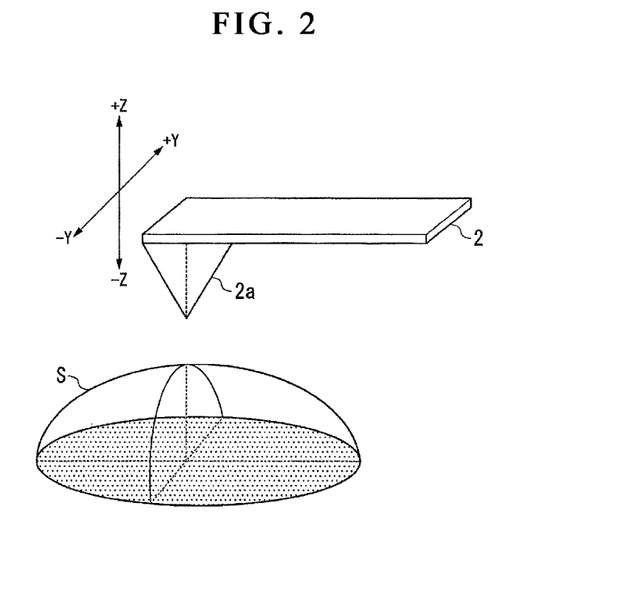
FIG. 2 is a perspective view of a sample S with an inclined plane and a cantilever 2 according to the present embodiment.

FIG. 2 is a perspective view of the cantilever 2 and the sample S having an inclined plane.

In the cantilever 2, displacement occurs in one or both of the Z- and Y-directions when the probe 2*a* and the surface of the sample S are brought into contact. In the present embodiment, the displacement of the cantilever 2 that occurs in the Z-direction is referred to as the amount of bending, and the displacement of the cantilever 2 that occurs in the Y-direction is referred to as the amount of torsion. For example, in the initial condition, the incident spot position on the light receiving surface 27 of the light detecting unit 33 of the laser light L2 reflected in a state where no force is applied to the probe 2*a* is set as the center position of the light receiving surface 27. The state in which no force is applied to the probe 2*a* is, for example, an undeformed state of the cantilever in which the probe 2*a* and the surface of the sample S are not in contact.

In contact mode, when the probe 2*a* and the surface of the sample S are brought into contact, since the force is applied to the probe 2*a*, the amount of bending and/or the amount of torsion occur in the cantilever 2. Accordingly, the reflected spot position of the laser light L2 reflected by the back surface of the cantilever 2 in which the amount of bending and/or the amount of torsion have/has occurred is displaced from its center position. Therefore, the scanning probe microscope 1 becomes capable of detecting the magnitude and direction of the force applied to the probe 2*a* by capturing the moving direction of the spot position on the light receiving surface 27 of the light detection unit 33. For example, in FIG. 1, when the amount of torsion has occurred in the cantilever 2, it is possible to catch a change in the spot position of the α direction on the light receiving surface 27 of the light detection unit 33. Further, when the amount of bending has occurred in the cantilever 2, it is possible to catch a change in the spot position of the β direction on the light receiving surface 27. Variation of the spot position from the center position is dependent on the amount of torsion and/or the amount of bending. Further, when the cantilever 2 is bent into the +Z-direction, the reflected spot of the laser light L2 on the light receiving surface 27 of the light detection unit 33 is changed to the +β direction. In addition, when the cantilever 2 is bent into the −Z-direction, the reflected spot of the laser light L2 on the light receiving surface 27 of the light detection unit 33 is changed to the −β direction. On the other hand, when the amount of torsion in the cantilever 2 occurs in the +Y-direction, the reflected spot position of the laser light L2 on the light receiving surface 27 of the light detection unit 33 is changed to the +α direction.

Further, when the amount of torsion in the cantilever 2 occurs in the −Y-direction, the reflected spot of the laser light L2 on the light receiving surface 27 of the light detection unit 33 is changed to the −α direction.

The light detection unit 33 outputs a first detection signal corresponding to the reflected spot position of the laser light L2 in the ±Z-direction of the light receiving surface 27 to the control device 7. That is, the first detection signal is a DIF signal corresponding to the amount of bending of the cantilever 2 (bending signal). Further, the light detection unit 33 outputs a second detection signal corresponding to the reflected spot position of the laser light L2 in the ±Y-direction of the light receiving surface 27 to the control device 7. That is, the second detection signal is a FFM signal corresponding to the amount of torsion of the cantilever 2 (torsion signal).

As shown in FIG. 1, the control device 7 is provided with a contact determination unit 42, a driving unit 43 and a measuring unit 44.

The contact determination unit 42 determines, based on the first detection signal and the second detection signal outputted from the light detection unit 33, whether or not the probe 2*a* is in contact with the surface of the sample S. That is, the contact determination unit 42 determines whether or not the probe 2*a* is in contact with the surface of the sample S based on the amount of bending and the amount of torsion of the cantilever 2.

The contact determination unit 42 includes a first determination unit 421 and a second determination unit 422.

The first determination unit 421 determines, if the amount of bending indicated by the first detection signal outputted from the light detection unit 33 exceeds a first range, that the probe 2*a* is in contact with the surface of the sample S. The first determination unit 421, when it is determined that the probe 2*a* has been in contact with the surface of the sample S, outputs a first contact signal indicating that the probe 2*a* is in contact with the surface of the sample S to the driving unit 43.

The second determination unit 422 determines, if the amount of torsion indicated by the second detection signal outputted from the light detection unit 33 exceeds a second range, that the probe 2*a* is in contact with the surface of the sample S. The second determining unit 422, when it is determined that the probe 2*a* has been in contact with the surface of the sample S, outputs a second contact signal indicating that the probe 2*a* is in contact with the surface of the sample S to the driving unit 43. Thus, the contact determination unit 42 determines, if at least one condition of a first condition that the amount of bending indicated by the first detection signal outputted from the light detection unit 33 exceeds the first range, and a second condition that the amount of torsion indicated by the second detection signal outputted from the light detection unit 33 exceeds the second range is satisfied, that the probe 2*a* has been in contact with the surface of the sample S. The first detection signal and the second detection signal are determined independently, but they may be determined by setting values corresponding to characteristics in the contact determination unit 42, such as determining that the contact has been made when a positive number of the square root of the sum of [the square of the first detection signal] and [the square of the second detection signal] becomes a certain level or more, etc.

Figure 3:
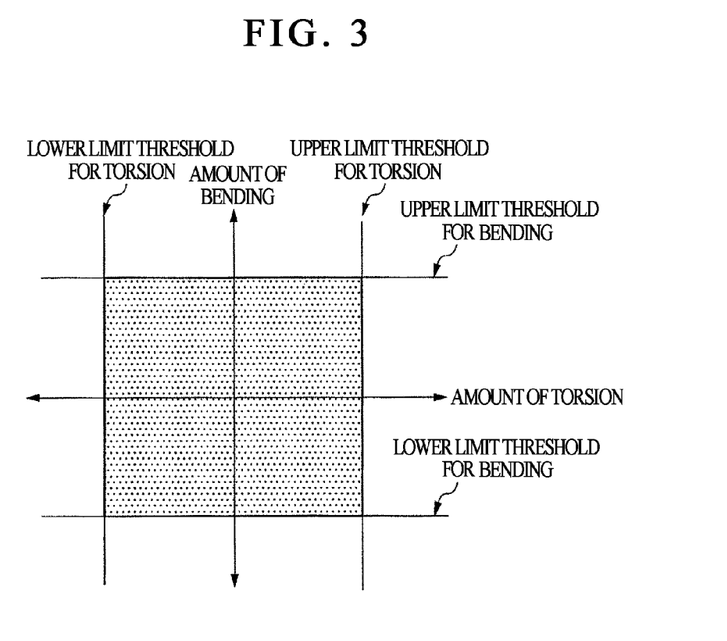
FIG. 3 explains a first range and a second range according to the present embodiment.

Hereinafter, the first range and the second range in the present embodiment will be described with reference to FIG. 3. FIG. 3 is a diagram for explaining the first range and the second range in the present embodiment.

As shown in FIG. 3, the first range comprises an upper limit threshold for bending and a lower limit threshold for bending. The upper limit threshold for bending is the amount of bending of the cantilever 2 that is bent in the +Z-direction by contact of the probe 2a and the surface of the sample S. On the other hand, the lower limit threshold for bending is the amount of bending of the cantilever 2 that is bent in the −Z-direction by contact of the probe 2a and the surface of the sample S. Accordingly, a first determination unit 421 determines, when the amount of bending indicated by the first detection signal outputted from the light detection unit 33 exceeds the upper limit threshold for bending, or the amount of bending indicated by the first detection signal falls below the lower limit threshold for bending, that the probe 2a has been in contact with the surface of the sample S.

The second range comprises an upper limit threshold for torsion and a lower limit threshold for torsion. The upper limit threshold for torsion is the amount of torsion of the cantilever 2 that is caused in the +Y-direction by contact of the probe 2a and the surface of the sample S. On the other hand, the lower limit threshold for torsion is the amount of bending of the cantilever 2 that is caused in the −Y-direction by contact of the probe 2a and the surface of the sample S. Accordingly, a second determination unit 422 determines, when the amount of torsion indicated by the second detection signal outputted from the light detection unit 33 exceeds the upper limit threshold for torsion, or the amount of torsion indicated by the second detection signal falls below the lower limit threshold for torsion, that the probe 2a has been in contact with the surface of the sample S. Thus, in the two-dimensional coordinates of the amount of bending and the amount of torsion shown in FIG. 3, if a position indicated by both the amount of bending indicated by the first detection signal and the amount of torsion indicated by the second detection signal is located outside the range indicated by hatching, it is to be determined that the probe 2a has been in contact with the surface of the sample S.

Figure 4:
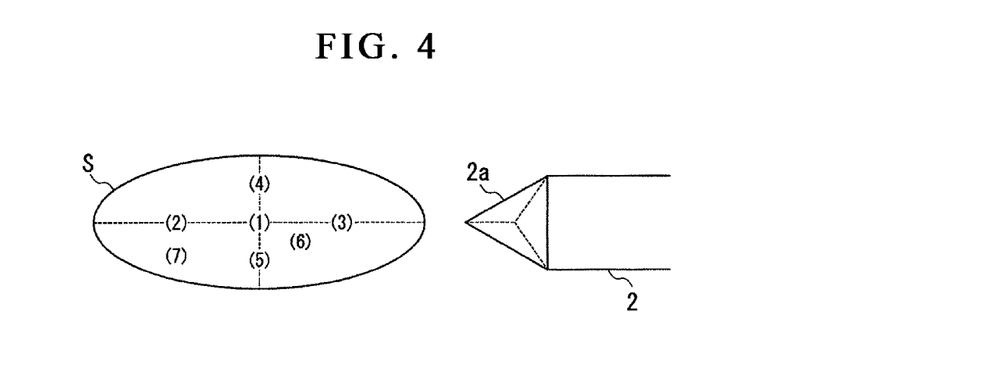
FIG. 4 is a plan view of a dome-shaped sample S according to the present embodiment and shows measurement points (1) to (7) of the shape measurement of the sample S.

Hereinafter, a method of determining the contact between the probe 2a and the surface of the sample S in the present embodiment will be described. FIG. 4 is a plan view of a dome-shaped sample S and shows measurement points (1) to (7) of the shape measurement of the sample S, i.e. positions where the probe 2a and the surface of the sample S are brought into contact.

Figure 5:
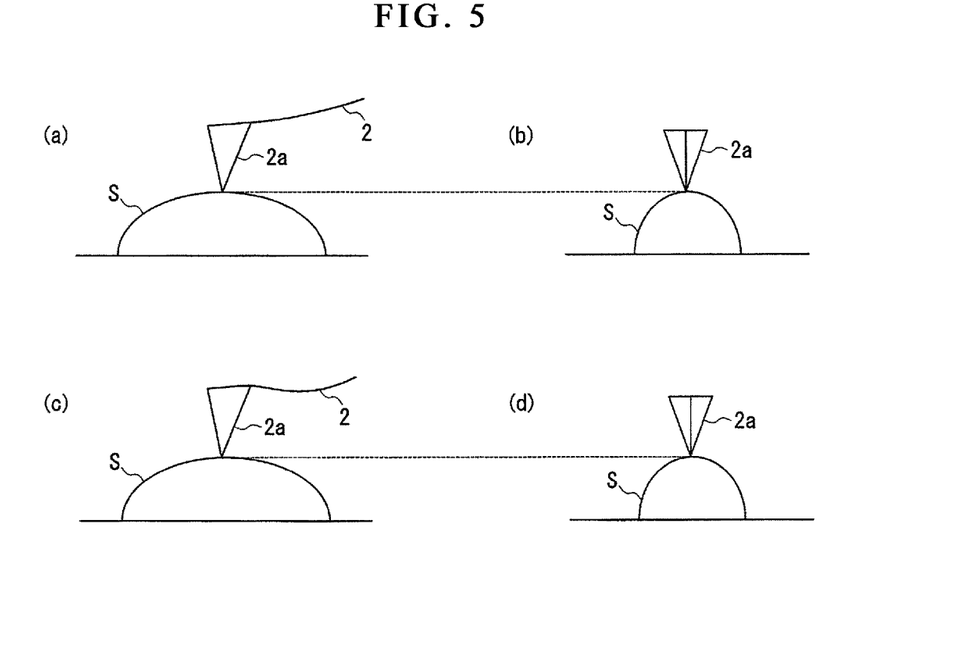
FIG. 5 shows displacement of the cantilever 2 at the time when the probe 2a is in contact with the measurement point (1) of the sample S according to the present embodiment.

FIG. 5 shows displacement of the cantilever 2 when the probe 2a has been in contact with the measurement point (1) of the sample S according to the present embodiment. FIG. 5(a) shows a side view of the cantilever 2 as seen from the −Y-direction in a state where the probe 2a has been in contact with the measurement point (1) and FIG. 5(b) shows a side view of the cantilever 2 as seen from the −X-direction in a state where the probe 2a has been in contact with the measurement point (1). FIG. 5(c) shows a side view of the cantilever 2 as seen from the −Y-direction in a state where the probe 2a has been further pushed after it had been in contact with the measurement point (1) and FIG. 5(d) shows a side view of the cantilever 2 as seen from the −X-direction in a state where the probe 2a has been further pushed after it had been in contact with the measurement point (1).

As shown in FIG. 5(a) and FIG. 5(b), in the case of the primary contact state where the probe 2a has been in contact with the measurement point (1), some amount of bending occurs in the cantilever 2, but since there is no inclination on the surface of the measurement point (1) (the surface is horizontal), the amount of torsion does not occur. Further, as shown in FIG. 5(c) and FIG. 5(d), in the case of the secondary contact state where the probe 2a has been pressed from the state where the probe 2a had been in contact with the measurement point (1), the amount of bending in accordance with the pressing force occurs in the cantilever 2. However, since there is no inclination on the surface of the measurement point (1), the amount of torsion does not occur. Therefore, the contact determination unit 42 determines whether or not the probe 2a has been in contact with the surface of the sample S based on whether the amount of bending indicated by the first detection signal exceeds the upper limit threshold for bending.

Figure 6:
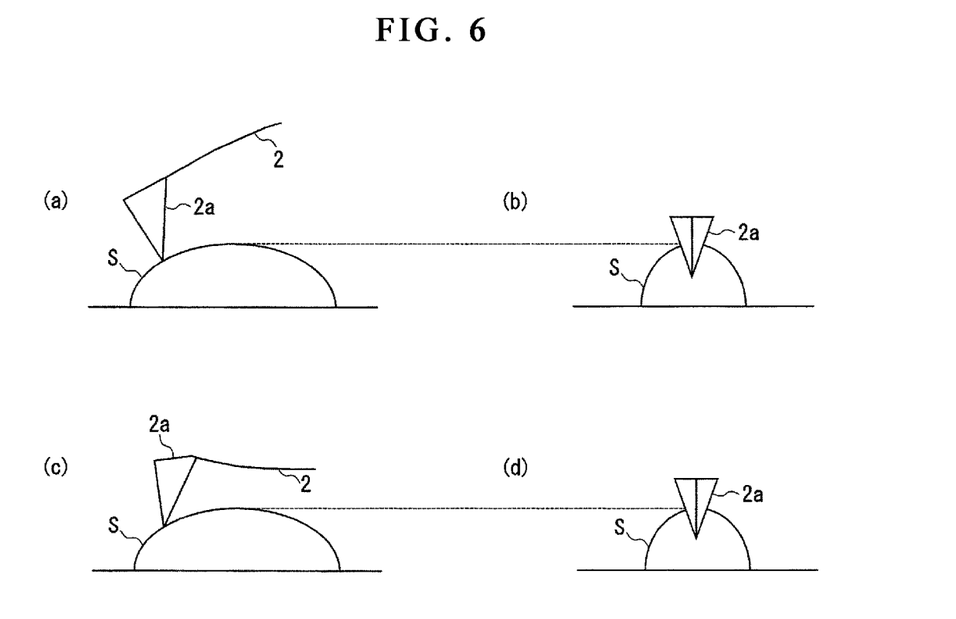
FIG. 6 shows displacement of the cantilever 2 at the time when the probe 2a is in contact with the measurement point (2) of the sample S according to the present embodiment.

FIG. 6 shows displacement of the cantilever 2 when the probe 2a has been in contact with the measurement point (2) of the sample S according to the present embodiment. FIG. 6(a) shows a side view of the cantilever 2 as seen from the −Y-direction in a state where the probe 2a has been in contact with the measurement point (2) and FIG. 6(b) shows a side view of the cantilever 2 as seen from the −X-direction in a state where the probe 2a has been in contact with the measurement point (2). FIG. 6(c) shows a side view of the cantilever 2 as seen from the −Y-direction in a state where the probe 2a has been further pushed after it had been in contact with the measurement point (2) and FIG. 6(d) shows a side view of the cantilever 2 as seen from the −X-direction in a state where the probe 2a has been further pushed after it had been in contact with the measurement point (2).

As shown in FIG. 6(a) and FIG. 6(b), in the case of the primary contact state where the probe 2a has been in contact with the measurement point (2), in the cantilever 2, by the normal force corresponding to the pressing force, the force of tilting the probe 2a and the amount of bending of the −Z-direction corresponding to the pressing force occur in the axial direction perpendicular to the surface of the sample S. However, since there is no ±Y-direction inclination on the surface of the measurement point (2), the amount of torsion does not occurs. On the other hand, as shown in FIG. 6(c) and FIG. 6(d), in the case of the secondary contact state where the probe 2a has been pressed from the state where the probe 2a had been in contact with the measurement point (2), in the cantilever 2, if the pressing force thereof is greater than the force for generating the amount of bending by the normal force, the direction of bending changes and the amount of bending in the +Z-direction occurs. However, since there is no ±Y-direction tilt on the surface of the measurement point (2), the amount of torsion does not occur.

Conventional scanning probe microscopes determine that the probe 2a is in contact with the surface of the sample S only if the amount of bending in the +Z-direction exceeds a predetermined value. Accordingly, the conventional scanning probe microscopes are unable to determine the contact between the probe 2a and the sample S, because the amount of bending in the −Z-direction is generated in the primary contact state where the probe 2a is in contact with the measurement point (2) (FIG. 6(a), FIG. 6(b)). Accordingly, the conventional scanning probe microscopes press the sample S with a greater pressing force, and when the cantilever 2 is in the secondary contact state where it is bent into +Z-direction (FIG. 6(c), FIG. 6(d)), they determine the contact between the probe 2a and the sample S. Therefore, there are cases where wear of the probe 2a or deformation of the sample S occurs. Since the scanning probe microscope 1 according to this embodiment determines that when the amount of bending of the cantilever 2 has exceeded the first range, the probe 2a is in contact with the surface of the sample S, it can determine the primary contact state between the probe 2a and the sample S, irrespective of direction of bending. Therefore, it is possible to suppress the wear of the probe 2a or the deformation of the sample S.

Figure 7:
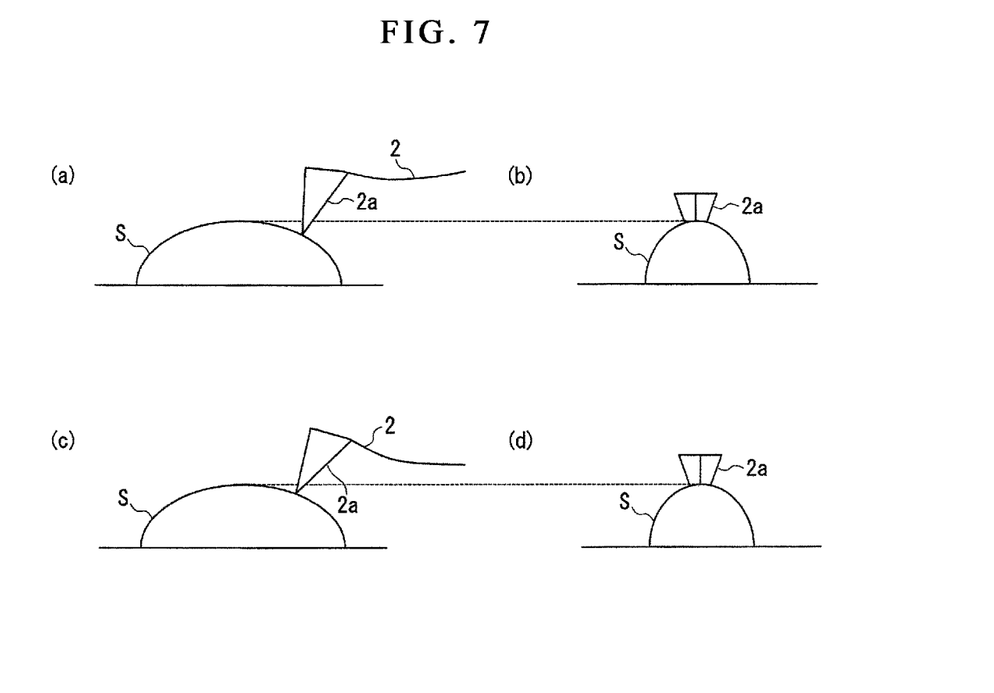
FIG. 7 shows displacement of the cantilever 2 at the time when the probe 2a is in contact with the measurement point (3) of the sample S according to the present embodiment.

FIG. 7 shows displacement of the cantilever 2 when the probe 2a has been in contact with the measurement point (3) of the sample S according to the present embodiment. FIG. 7(a) shows a side view of the cantilever 2 as seen from the −Y-direction in a state where the probe 2a has been in contact with the measurement point (3) and FIG. 7(b) shows a side view of the cantilever 2 as seen from the −X-direction in a state where the probe 2a has been in contact with the measurement point (3). FIG. 7(c) shows a side view of the cantilever 2 as seen from the −Y-direction in a state where the probe 2a has been further pushed after it had been in contact with the measurement point (3) and FIG. 7(d) shows a side view of the cantilever 2 as seen from the −X-direction in a state where the probe 2a has been further pushed after it had been in contact with the measurement point (3).

As shown in FIG. 7(a) and FIG. 7(b), in the case where the probe 2a has been in contact with the measurement point (3), in the cantilever 2, by the normal force corresponding to the pressing force, the force of tilting the probe 2a and the amount of bending of the +Z-direction corresponding to the pressing force occur in the axial direction perpendicular to the surface of the sample S. However, since there is no ±Y-direction inclination on the surface of the measurement point (3), the amount of torsion does not occur. On the other hand, as shown in FIG. 7(c) and FIG. 7(d), in the case where the probe 2a has been pressed from the state where the probe 2a had been in contact with the measurement point (3), in the cantilever 2, the amount of bending according to the pressing force occurs. However, since there is no ±Y-direction inclination on the surface of the measurement point (3), the amount of torsion does not occur. Therefore, the contact determination unit 42 determines whether or not the probe 2a is in contact with the surface of the sample S based on whether the amount of bending indicated by the first detection signal exceeds the upper limit threshold for bending.

Figure 8:
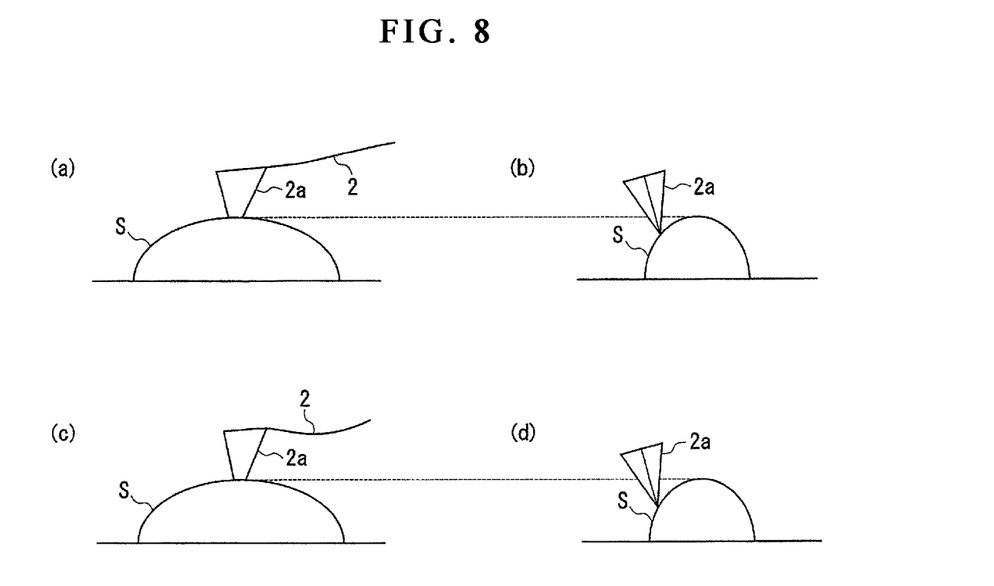
FIG. 8 shows displacement of the cantilever 2 at the time when the probe 2a is in contact with the measurement point (4) of the sample S according to the present embodiment.

FIG. 8 shows displacement of the cantilever 2 when the probe 2a has been in contact with the measurement point (4) of the sample S according to the present embodiment. FIG. 8(a) shows a side view of the cantilever 2 as seen from the −Y-direction in a state where the probe 2a has been in contact with the measurement point (4) and FIG. 8(b) shows a side view of the cantilever 2 as seen from the −X-direction in a state where the probe 2a has been in contact with the measurement point (4). FIG. 8(c) shows a side view of the cantilever 2 as seen from the −Y-direction in a state where the probe 2a has been further pushed after it had been in contact with the measurement point (4) and FIG. 8(d) shows a side view of the cantilever 2 as seen from the −X-direction in a state where the probe 2a has been further pushed after it had been in contact with the measurement point (4).

As shown in FIG. 8(a) and FIG. 8(b), in the case where the probe 2a has been in contact with the measurement point (4), in the cantilever 2, some amount of bending occurs and at the same time the amount of torsion of the +Y-direction by the normal force corresponding to the pressing force occurs. This is because there is a +Y-direction inclination on the surface of the sample S at the measurement point (4). Further, as shown in FIG. 8(c) and FIG. 8(d), in the case where the probe 2a has been pressed from the state where the probe 2a had been in contact with the measurement point (4), in the cantilever 2, the amount of bending according to the pressing force occurs and at the same time the amount of torsion of the +Y-direction by the normal force corresponding to the pressing force occurs.

Here, the amount of bending generated in the cantilever 2 is affected by, in addition to the pressing force, the inclination of the surface of the sample to be pressed. For example, in the case where the surface of the sample S with which the probe 2a is in contact is an inclination plane, in order that the amount of bending of the cantilever 2 becomes a predetermined value or more, a greater pressing force is required as compared to the horizontal plane. Therefore, when comparing the measurement point (1) with the measurement point (4), a greater pressing force is required to generate an amount of bending equivalent to that of the measurement point (1).

In conventional scanning probe microscopes, the predetermined value is set to the amount of bending at the time when the probe 2a is in contact with the measurement point (1). This is because the bending of the cantilever 2 is set to be constant in the conventional scanning probe microscopes. Therefore, in the conventional scanning probe microscopes, the contact between the probe 2a and the sample S cannot be detected in the state where the probe 2a is in contact with the measurement point (4) (FIG. 8(a), FIG. 8(b)). Accordingly, the conventional scanning probe microscopes apply a greater pressing force to the sample S, and detect the contact between the probe 2a and the sample S when the amount of bending of −Z-direction occurs in the cantilever 2 to the extent that the amount exceeds the predetermined value (FIG. 8(c), FIG. 8(d)). Therefore, there are cases where wear of the probe 2a or deformation of the sample S occurs. The scanning probe microscope 1 of this embodiment can detect the contact between the probe 2a and the sample S on the basis of the amount of torsion of the cantilever 2. That is, when the probe 2a is in contact with the measurement point (4) having an inclined surface (FIG. 8(a), FIG. 8(b)), the scanning probe microscope 1 can detect the contact between the probe 2a and the sample S on the basis of the amount of torsion of the cantilever 2. Therefore, the wear of the probe 2a or the deformation of the sample S can be suppressed.

Figure 9:
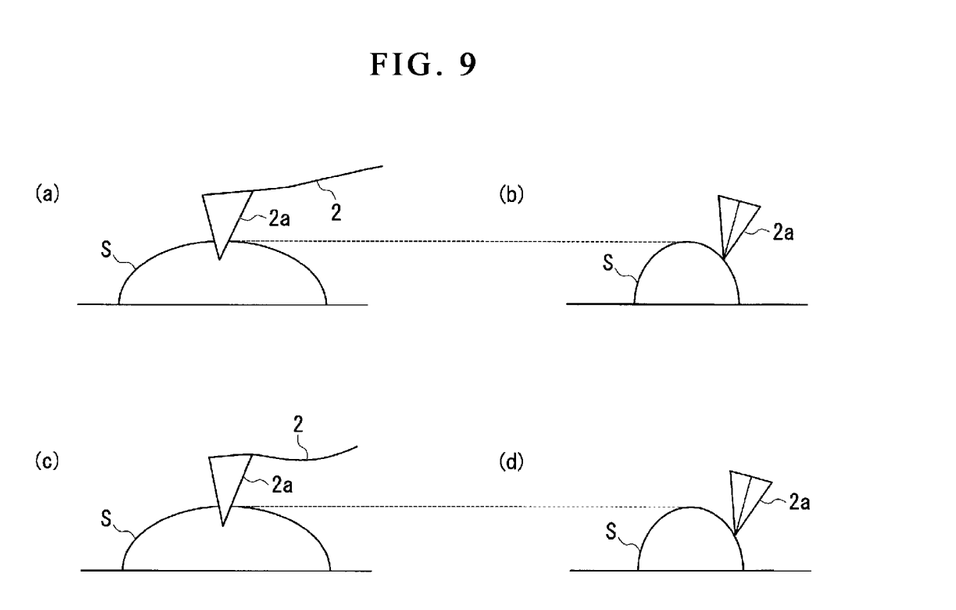
FIG. 9 shows displacement of the cantilever 2 at the time when the probe 2a is in contact with the measurement point (5) of the sample S according to the present embodiment.

FIG. 9 shows displacement of the cantilever 2 when the probe 2a has been in contact with the measurement point (5) of the sample S according to the present embodiment. FIG. 9(a) shows a side view of the cantilever 2 as seen from the −Y-direction in a state where the probe 2a has been in contact with the measurement point (5) and FIG. 9(b) shows a side view of the cantilever 2 as seen from the −X-direction in a state where the probe 2a has been in contact with the measurement point (5). FIG. 9(c) shows a side view of the cantilever 2 as seen from the −Y-direction in a state where the probe 2a has been further pushed after it had been in contact with the measurement point (5) and FIG. 9(d) shows a side view of the cantilever 2 as seen from the −X-direction in a state where the probe 2a has been further pushed after it had been in contact with the measurement point (5).

As shown in FIG. 9(a) and FIG. 9(b), in the case where the probe 2a has been in contact with the measurement point (5), in the cantilever 2, some amount of bending occurs and at the same time the amount of torsion of the −Y-direction by the normal force corresponding to the pressing force occurs. This is because there is a −Y-direction inclination on the surface of the sample S at the measurement point (5). Further, as shown in FIG. 9(*c*) and FIG. 9(*d*), in the case where the probe 2*a* has been pressed from the state where the probe 2*a* had been in contact with the measurement point (5), in the cantilever 2, the amount of bending according to the pressing force occurs and at the same time the amount of torsion of the −Y-direction by the normal force corresponding to the pressing force occurs.

Here, the amount of bending generated in the cantilever 2 is affected by, in addition to the pressing force, the inclination of the surface of the sample to be pressed. For example, in the case where the surface of the sample S with which the probe 2*a* is in contact is an inclination plane, in order that the amount of bending of the cantilever 2 becomes a predetermined value or more, a greater pressing force is required as compared to the horizontal plane. Therefore, when comparing the measurement point (1) with the measurement point (5), a greater pressing force is required to generate an amount of bending equivalent to that of the measurement point (1).

In conventional scanning probe microscopes, the predetermined value is set to the amount of bending at the time when the probe 2*a* is in contact with the measurement point (1). Therefore, in the conventional scanning probe microscopes, the contact between the probe 2*a* and the sample S cannot be detected in the state where the probe 2*a* is in contact with the measurement point (5) (FIG. 9(*a*), FIG. 9(*b*)). Accordingly, the conventional scanning probe microscopes apply a greater pressing force to the sample S, and detect the contact between the probe 2*a* and the sample S when the amount of bending of +Z-direction occurs in the cantilever 2 to the extent that the amount exceeds the predetermined value (FIG. 9(*c*), FIG. 9(*d*)). Therefore, there are cases where wear of the probe 2*a* or deformation of the sample S occurs. The scanning probe microscope 1 of this embodiment can detect the contact between the probe 2*a* and the sample S on the basis of the amount of torsion of the cantilever 2. That is, when the probe 2*a* is in contact with the measurement point (5) having an inclined surface (FIG. 9(*a*), FIG. 9(*b*)), the scanning probe microscope 1 can detect the contact between the probe 2*a* and the sample S on the basis of the amount of torsion of the cantilever 2. Therefore, the wear of the probe 2*a* or the deformation of the sample S can be suppressed.

Figure 10:
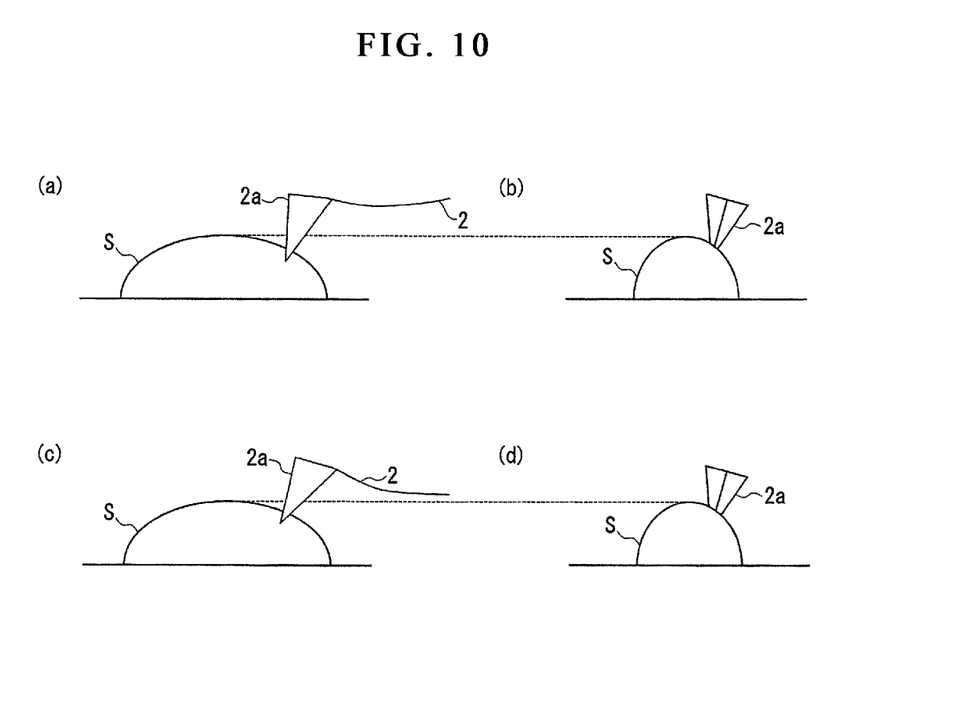
FIG. 10 shows displacement of the cantilever 2 at the time when the probe 2a is in contact with the measurement point (6) of the sample S according to the present embodiment.

FIG. 10 shows displacement of the cantilever 2 when the probe 2*a* has been in contact with the measurement point (6) of the sample S according to the present embodiment. FIG. 10(*a*) shows a side view of the cantilever 2 as seen from the −Y-direction in a state where the probe 2*a* has been in contact with the measurement point (6) and FIG. 10(*b*) shows a side view of the cantilever 2 as seen from the −X-direction in a state where the probe 2*a* has been in contact with the measurement point (6). FIG. 10(*c*) shows a side view of the cantilever 2 as seen from the −Y-direction in a state where the probe 2*a* has been further pushed after it had been in contact with the measurement point (6) and FIG. 10(*d*) shows a side view of the cantilever 2 as seen from the −X-direction in a state where the probe 2*a* has been further pushed after it had been in contact with the measurement point (6).

As shown in FIG. 10(*a*) and FIG. 10(*b*), in the case that the probe 2*a* has been in contact with the measurement point (6), in the cantilever 2, by the normal force corresponding to the pressing force, the force of tilting the probe 2*a* and the amount of bending of the +Z-direction corresponding to the pressing force occur in the axial direction perpendicular to the surface of the sample S. In addition, the amount of torsion of the −Y-direction by the normal force corresponding to the pressing force occurs in the cantilever 2. Further, as shown in FIG. 10(*c*) and FIG. 10(*d*), in the case where the probe 2*a* has been pressed from the state where the probe 2*a* had been in contact with the measurement point (6), in the cantilever 2, the amount of bending according to the pressing force occurs and at the same time the amount of torsion of the −Y-direction by the normal force corresponding to the pressing force occurs. Therefore, the contact determination unit 42 can determine whether or not the probe 2*a* has been in contact with the surface of the sample S, based on whether or not the amount of bending indicated by the first detection signal exceeds the upper limit threshold for bending, or whether or not the amount of torsion indicated by the second detection signal exceeds the upper limit threshold for torsion.

Figure 11:
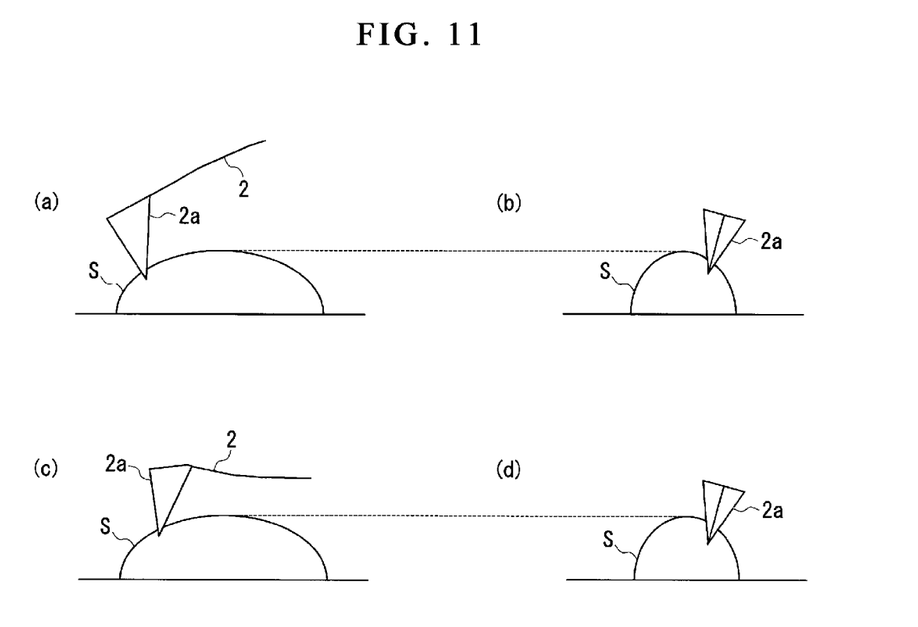
FIG. 11 shows displacement of the cantilever 2 at the time when the probe 2a is in contact with the measurement point (7) of the sample S according to the present embodiment.

FIG. 11 shows displacement of the cantilever 2 when the probe 2*a* has been in contact with the measurement point (7) of the sample S according to the present embodiment. FIG. 11(*a*) shows a side view of the cantilever 2 as seen from the −Y-direction in a state where the probe 2*a* has been in contact with the measurement point (7) and FIG. 11(*b*) shows a side view of the cantilever 2 as seen from the −X-direction in a state where the probe 2*a* has been in contact with the measurement point (7). FIG. 11(*c*) shows a side view of the cantilever 2 as seen from the −Y-direction in a state where the probe 2*a* has been further pushed after it had been in contact with the measurement point (7) and FIG. 11(*d*) shows a side view of the cantilever 2 as seen from the −X-direction in a state where the probe 2*a* has been further pushed after it had been in contact with the measurement point (7).

As shown in FIG. 11(*a*) and FIG. 11(*b*), in the case of the primary contact state where the probe 2*a* has been in contact with the measurement point (7), in the cantilever 2, by the normal force corresponding to the pressing force, the force of tilting the probe 2*a* and the amount of bending of the −Z-direction corresponding to the pressing force occur in the axial direction perpendicular to the surface of the sample S. In addition, the amount of torsion of the −Y-direction by the normal force corresponding to the pressing force occurs in the cantilever 2. On the other hand, as shown in FIG. 11(*c*) and FIG. 11(*d*), in the case of the secondary contact state where the probe 2*a* has been pressed from the state where the probe 2*a* had been in contact with the measurement point (7), if the pressing force is greater than the force for generating the amount of bending by the normal force, the direction of bending changes and the amount of bending in the +Z-direction occurs. In addition, the amount of torsion of the −Y-direction by the normal force corresponding to the pressing force occurs in the cantilever 2.

Conventional scanning probe microscopes determine that the probe 2*a* is in contact with the surface of the sample S only if the amount of bending in the +Z-direction exceeds a predetermined value. For that reason, the conventional scanning probe microscopes are unable to determine the contact between the probe 2*a* and the sample S in the primary contact state where the probe 2*a* is in contact with the measurement point (7) (FIG. 11(*a*), FIG. 11(*b*)). Accordingly, as described above, the conventional scanning probe microscopes press the sample S with a greater pressing force, and when the cantilever 2 is in the secondary contact state where it is bent into +Z-direction (FIG. 11(*c*), FIG. 11(*d*)), they determine the contact between the probe 2*a* and the sample S. Therefore, there are cases where wear of the probe 2*a* or deformation of the sample S occurs. Since the scanning probe microscope 1 according to this embodiment determines that when the amount of bending of the cantilever 2 has exceeded the first range, the probe 2a is in contact with the surface of the sample S, it can determine the primary contact state between the probe 2a and the sample S, irrespective of direction of bending. Therefore, the wear of the probe 2a or the deformation of the sample S can be suppressed.

As described above, in the conventional scanning probe microscopes, the variation in the pressing force at the time of detecting the contact between the probe 2a and the sample S has occurred depending on the shape of the surface of the sample with which the probe is in contact. In the scanning probe microscope 1 of this embodiment, since the state where the probe 2a has been in contact with the sample is determined by detection of all directions even if the displacement (the amount of torsion) of the lowering direction (−Z-direction) and the torsion direction (±Y-direction) in addition to the amount of bending by the lifting direction (+Z-direction) occur, the variation in the pressing force due to the influence of the inclination of the surface of sample S can be reduced and accordingly, the excessive pressing of probe 2a to the sample S can be prevented before it occurs.

Referring back to FIG. 1, the driving unit 43 controls the movement driving unit 5 to drive the cantilever 2. The driving unit 43 brings the probe 2a into contact with the surface of the sample S by lowering the cantilever 2 with the movement driving unit 5. Then, when the probe 2a is in contact with the surface of the sample S, the measuring unit 44 measures a distance by which the cantilever has been moved, thereby measuring the uneven shape of the surface of the sample S. As above, when the probe 2a is brought into contact with the surface of the sample S, the measuring unit 44 measures a relative distance which is a distance by which one is moved relative to the other (hereinafter, simply referred to as "relative distance"). In the present embodiment, the relative distance is a travel distance of the cantilever 2 that has been lowered until the probe 2a is in contact with the surface of the sample S, but it may be a travel distance of the cantilever 2 that has been lifted until the probe 2a is in contact with the surface of the sample S. Further, the measuring unit 44 may measure the properties of the surface of the sample S. For example, the measuring unit 44 may measure the uneven shape of the surface of the sample S by continuously scanning the surface of the sample S in a state where the probe 2a is in contact with the surface of sample S. Further, the driving unit 43 may use an intermittent measurement method where it intermittently scans the surface of the sample S by bringing the probe 2a into contact with the surface of the sample S at a predetermined plurality of measurement points of the surface of sample S only and measures the uneven shape of the surface of the sample S. In the intermittent measurement method, when the probe 2a is moved between the predetermined plurality of measurement points, the probe 2a is moved in a state where it has been separated from the surface of the sample S by a predetermined distance (hereinafter, referred to as "separation distance") to avoid contact with convex portions of the sample S and the probe 2a is brought close to the surface of the sample S at the location of the next measurement point. Then, in the intermittent measurement method, the probe 2a is brought into contact with the surface of the sample S and then the measurement for the uneven shape of the surface of the sample S is carried out. Thereafter, the probe 2a is moved backwards to a location which is away from the surface of the sample S by the separation distance.

In the present embodiment, a case where the control device 7 uses the intermittent measurement method will be described.

The driving unit 43 includes a first driving unit 431 and a second driving unit 432.

The first driving unit 431, when scanning the surface of the sample S, outputs a first drive signal to the Z-direction driving device 22 and lowers the cantilever 2 in order to bring the probe 2a in contact with the surface of the sample S. Thus, the first driving unit 431 brings the probe 2a to be close to the surface of the sample S.

The first driving unit 431, when at least one of the first and second contact signals has been outputted from the contact determination unit 42, stops the output of the first drive signal to the Z-direction driving device 22, thereby stopping the lowering movement of the cantilever 2.

After the lowering movement of the cantilever 2 has been stopped by the first driving unit 431, the measuring unit 44 measures the relative distance. If the relative distance measurement by the measuring unit 44 has been completed, the first driving unit 431 moves the probe 2a backwards by the separation distance from the surface of the sample S. Then, the second driving unit 432 outputs the second drive signal to XY-scanner 25 to move the probe 2a to a before-lowering position for measurement located directly above the next measurement position. Then, the first driving unit 431 lowers the cantilever 2 from the before-lowering position for measurement and brings the probe 2a into contact at the next measurement position. Then, the relative distance measurement by the measuring unit 44 is performed again.

The measuring unit 44 measures the uneven shape of the surface of the sample S in the state where the probe 2a is in contact with the surface of the sample S. That is, the measuring unit 44 measures the uneven shape of the surface of the sample S by acquiring the relative distance at each of measurement positions. For example, the measuring unit 44 may calculate the relative distance based on the voltage value of the first drive signal in the state where the probe 2a is in contact with the surface of the sample S. Further, the measuring unit 44 may measure a displacement of the first driving unit 431 directly by sensors (not shown) and may measure the height of the probe directly by sensors (not shown).

Figure 12:
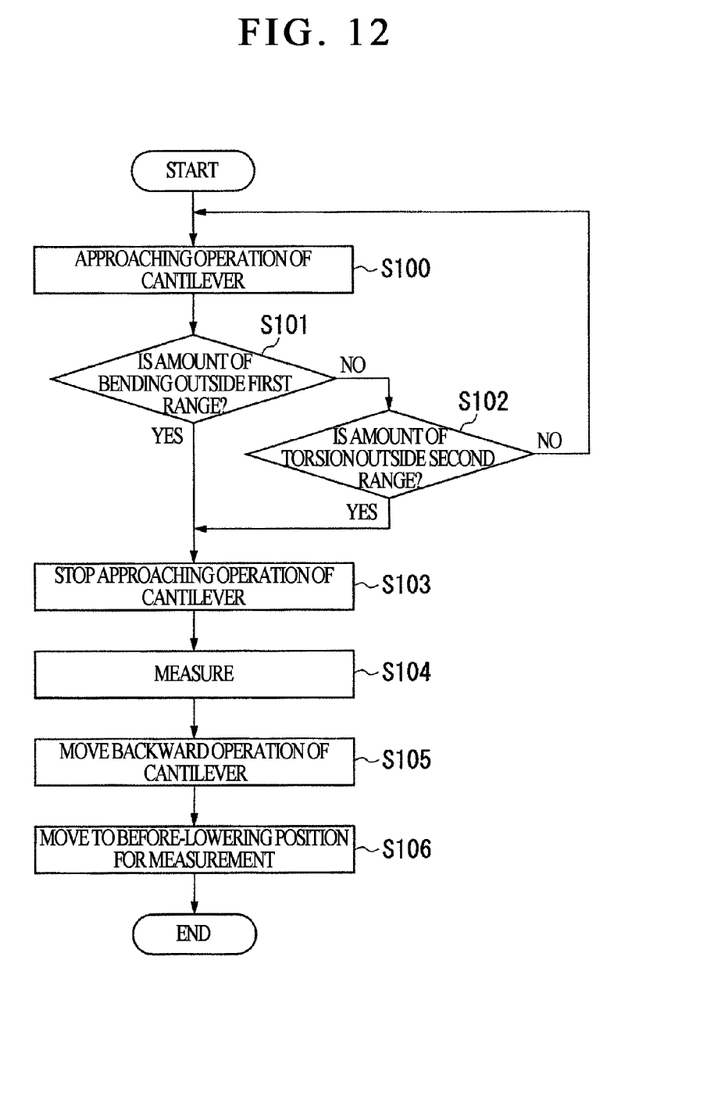
FIG. 12 shows a flow of an example of the contact detection process for detecting the contact between the probe 2a and the surface of the sample S in the control device 7 of the present embodiment.

Hereinafter, a flow of the contact detection process for detecting the contact between the probe 2a and the surface of the sample S in the control device 7 of this embodiment will be described. FIG. 12 shows a flow of the contact detection process for detecting the contact between the probe 2a and the surface of the sample S in the control device 7 of the present embodiment. It should be noted that, as an initial condition, the probe 2a is located at a before-lowering position for measurement at a given measurement point.

The first driving unit 431 starts an approaching operation (step S100) in which the first driving unit 431 outputs a first drive signal to the Z-direction driving device 22 and lowers the cantilever 2 in order to bring the probe 2a in contact with the surface of the sample S, thereby bringing the probe 2a to be close to the surface of the sample S.

The first determination unit 421 determines whether or not the amount of bending indicated by the first detection signal to be outputted from the light detection unit 33 is outside the first range (step S101). When the amount of bending indicated by the first detection signal to be outputted from the light detection unit 33 is outside the first range, the first determination unit 421 determines that the probe 2a has been brought into contact with the surface of the sample S and outputs the first contact signal to the first driving unit 431. When it has been determined that the amount of bending indicated by the first detection signal to be outputted from the light detection unit 33 is within the first range, the second determination unit 422 determines whether or not the amount of torsion indicated by the second detection signal to be outputted from the light detection unit 33 is outside the second range (step S102). When the amount of torsion indicated by the second detection signal to be outputted from the light detection unit 33 is outside the second range, the second determination unit 422 determines that the probe 2*a* has been brought into contact with the surface of the sample S and outputs the second contact signal to the first driving unit 431. When the amount of torsion indicated by the second detection signal to be outputted from the light detection unit 33 is not outside the second range, the second determination unit 422 continues the approaching operation of the cantilever. It should be noted that in FIG. 12, after the processing of step S101, the processing of step S102 is executed, but this embodiment is not limited thereto. The control device 7 in the present embodiment may execute the processing of step S101 after the processing of step S102 or may execute the processing of step S101 and the processing of step S102 in parallel.

The first driving unit 431, when acquiring at least one of the first contact signal and the second the contact signal, stops the approaching operation of the cantilever 2 by stopping the output of the first drive signal to the Z-direction driving unit 22 (step S103).

The measuring unit 44 may measure the uneven shape of the surface of the sample S by calculating the relative distance based on the voltage value of the first drive signal in the state where the probe 2*a* is in contact with the surface of the sample S (step S104).

The first drive unit 431, when the measurement of the uneven shape at a predetermined measurement position by the measuring unit 44 is completed, moves the probe 2*a* backwards by the separation distance from the surface of the sample S (step S105). Then, the second driving unit 432 moves the probe 2*a* to the before-lowering position for measurement located directly above the next measurement position by outputting the second drive signal to the XY-scanner 25 (step S106).

Figure 13:
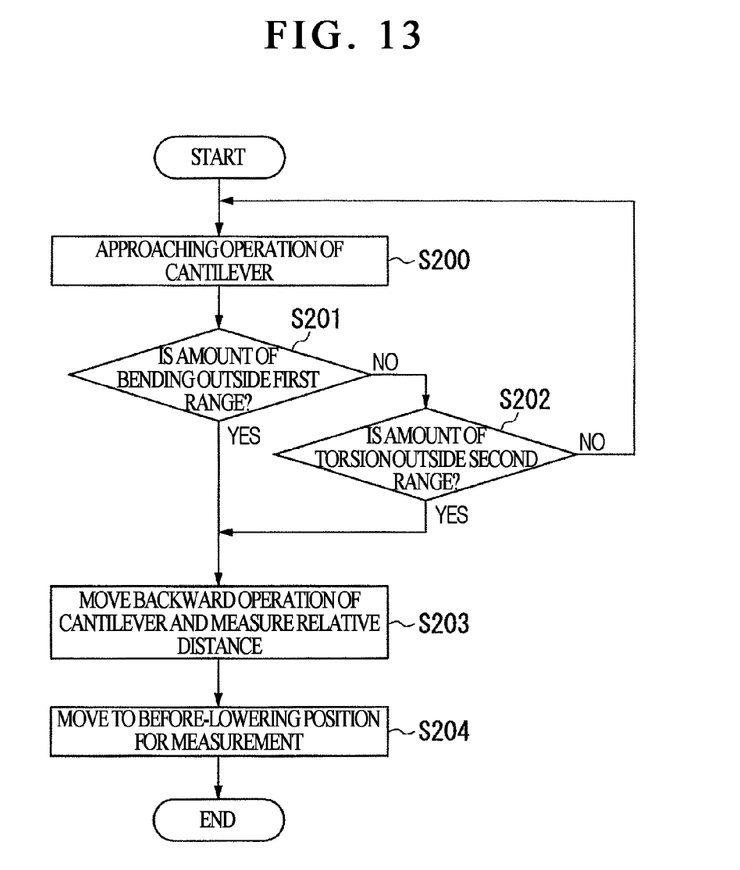
FIG. 13 shows a flow of another example of the contact detection process for detecting the contact between the probe 2a and the surface of the sample S in the control device 7 of the present embodiment.

The scanning probe microscope 1, in the contact detection process, may perform parallel measurements (hereinafter, referred to as "parallel measurements") as well as sequential measurements as described above. For example, the measuring unit 44 measures the relative distance when at least one of the first contact signal and the second contact signal is outputted from the contact determination unit 42 and at the same time the first driving unit 431 inverts the output of the first drive signal to the Z-direction driving device 22, thereby inverting the lowering movement of the cantilever 2. Hereinafter, the parallel measurement according to this embodiment will be described. FIG. 13 shows a flow of the parallel measurements of the contact detection process according to this embodiment.

The first driving unit 431 starts an approaching operation (step S200) in which the first driving unit 431 outputs a first drive signal to the Z-direction driving device 22 and lowers the cantilever 2 in order to bring the probe 2*a* in contact with the surface of the sample S, thereby bringing the probe 2*a* to be close to the surface of the sample S.

The first determination unit 421 determines whether or not the amount of bending indicated by the first detection signal to be outputted from the light detection unit 33 is outside the first range (step S201). When the amount of bending indicated by the first detection signal to be outputted from the light detection unit 33 is outside the first range, the first determination unit 421 determines that the probe 2*a* has been brought into contact with the surface of the sample S and outputs the first contact signal to the first driving unit 431. When it has been determined that the amount of bending indicated by the first detection signal to be outputted from the light detection unit 33 is within the first range, the second determination unit 422 determines whether or not the amount of torsion indicated by the second detection signal to be outputted from the light detection unit 33 is outside the second range (step S202). When the amount of torsion indicated by the second detection signal to be outputted from the light detection unit 33 is outside the second range, the second determination unit 422 determines that the probe 2*a* has been brought into contact with the surface of the sample S and outputs the second contact signal to the first driving unit 431.

For example, the measuring unit 44 measures continuously the relative distance when the contact detection process is started. Then, the measuring unit 44 determines the relative distance when at least one of the first contact signal and the second contact signal has been outputted from the contact determination unit 42 as the relative distance when the probe 2*a* has been in contact with the sample S (step S203). The measuring unit 44 may measure the relative distance only when both the first contact signal and the second contact signal are outputted from the contact determination unit 42.

The first driving unit 431 moves the probe 2*a* backwards by the separation distance from the surface of the sample S simultaneously with the determination of the relative distance by the measuring unit 44 (step S203). Then, the second driving unit 432 moves the probe 2*a* to the before-lowering position for measurement located directly above the next measurement position by outputting the second drive signal to the XY-scanner 25 (step S204).

Thus, the parallel measurement in the present embodiment can measure the relative distance when the probe 2*a* of the cantilever 2 has been in contact with the sample S without stopping the cantilever 2. If the relative distance is measured after the cantilever 2 has been stopped, there is a case where some time overrun occurs until the cantilever 2 stops, then the error of the measured value of the measuring unit 44 is increased, and the force to the sample S is pressed strongly as by the error.

Since the scanning probe microscope 1 according to this embodiment can perform the detection of the contact between the probe 2*a* and the sample S and the measurement of the relative distance at the time of the contact simultaneously, the overrun of the cantilever 2 can be suppressed, and then the increase of the error of the measured value of the measuring unit 44 can be suppressed. Therefore, according to the scanning probe microscope 1, the force which is strongly pressed to the sample S can be reduced.

As described above, the scanning probe microscope 1 in this embodiment which is a scanning probe microscope for scanning a surface of a sample S with a probe 2*a* by bringing the probe 2*a* into contact with the surface of the sample S determines whether or not the probe 2*a* has been brought into contact with the surface of the sample S, based on the amount of bending and the amount of torsion of the cantilever 2. Specifically, the scanning probe microscope 1 determines, if at least one condition of the first condition that the amount of bending of the cantilever 2 exceeds the first range, and the second condition that the amount of torsion of the cantilever 2 exceeds the second range is satisfied, that the probe 2a has been in contact with the surface of the sample S. Thereby, it is possible to improve the phenomenon that when the surface of the sample S with which the probe 2a is in contact is an inclined plane, the value of the pressing force of the contact detection which detects the contact between the probe 2a and the surface of the sample S is changed as compared to the horizontal plane.

Further, in the above embodiment, the scanning probe microscope 1 may determine whether or not there is an inclination on the surface of the sample S in the scanning direction, based on the amount of torsion indicated by the second detection signal to be outputted by the light detection unit 33. Further, the scanning probe microscope 1 may predict a magnitude of the inclination (angle) on the surface of the sample S in the scanning direction, based on a magnitude of the amount of torsion indicated by the second detection signal to be outputted by the light detection unit 33. Further, the scanning probe microscope 1 may determine whether the inclination on the surface of the sample S in the scanning direction is a downward inclination or upward inclination, based on a sign of the amount of torsion indicated by the second detection signal to be outputted by the light detection unit 33.

Further, in the above embodiment, the scanning probe microscope 1 may further comprise a calculating unit for calculating the separation distance by which the probe 2a is moved backwards into a direction which is away from the surface of the sample S, based on the amount of torsion indicated by the second detection signal to be outputted by the light detection unit 33. That is, the scanning probe microscope 1, in the intermittent measurement method, may determine the separation distance at the time of moving the probe 2a to a before-lowering position for next measurement, based on the amount of torsion of the cantilever 2. For example, the calculating unit determines the separation distance, based on a magnitude or sign of the amount of torsion indicated by the second detection signal to be outputted by the light detection unit 33. Furthermore, the calculating unit may determine the separation distance by being provided with a table in which each of values of the amount of torsion is related to each of separation distances and selecting from the table a separation distance corresponding to the amount of torsion indicated by the second detection signal to be outputted by the light detection unit 33. The optimum value of the separation distance differs depending on the shape of the surface of the sample S. Accordingly, when scanning an unknown sample of which shape of surface is not known, it is necessary to estimate in advance the optimum value of the separation distance. In the present embodiment, since it is possible to determine the separation distance in accordance with the inclination of the inclined surface of the sample S in the scanning direction, it becomes possible to reduce the contact between the probe 2a and the sample S and to shorten the measurement time at the time of moving the probe 2a to a before-lowering position for measurement located directly above a next measurement position.

Further, in the above embodiment, the scanning probe microscope 1, during movement of the probe 2a to a before-lowering position for measurement located directly above a next measurement position, may detect the contact between the probe 2a and the surface of the sample S based on the amount of torsion indicated by the second detection signal to be outputted by the light detection unit 33. For example, when the scanning probe microscope 1 detects the contact between the probe 2a and the surface of the sample S during the movement of the probe 2a relative to a before-lowering position for measurement located directly above a next measurement position, it stops the movement and moves the probe 2a backwards from the surface of sample S to +Z-direction. As a result, even if the probe 2a and the sample S have been in contact during the movement of the probe 2a to a before-lowering position for measurement, the wear of probe 2a or the damage of the sample S can be suppressed as compared with conventional scanning probe microscopes.

Further, in the above embodiment, the scanning probe microscope 1 may determine that the probe 2a is not in contact with the surface of the sample S, based on the amount of bending indicated by the first detection signal and the amount of torsion indicated by the second detection signal in the backward-movement operation of the intermittent measurement method.

Further, in the above embodiment, when the surface of the sample S is continuously scanned in a state where the probe 2a is in contact with the surface of the sample S, the scanning probe microscope 1 may control the Z-direction driving device 22 so that the amount of bending indicated by the first detection signal is within the first range and the amount of torsion indicated by the second detection signal is within the second range. Thus, even when the surface of the sample S has an inclined plane, a distance between the probe 2a and the surface of the sample S can be maintained at a constant distance.

Further, in the above embodiment, by moving the cantilever 2 instead of moving the sample stage 4, the probe 2a and the sample S may be caused to move relative to the XY-directions.

The control device 7 in the embodiment described above may be implemented in a computer. In that case, it may be implemented by recording a program for implementing the function of the control device 7 in a computer-readable recording medium, reading the program recorded in the recording medium into a computer system, and executing the program. The "computer system" includes an OS and some hardware such as peripheral devices. In addition, the "computer-readable recording medium" refers to a storage device such as a flexible disk, a magneto-optical disk, ROM, a portable medium such as a CD-ROM, or a hard disk built in the computer system. Furthermore, the "computer-readable recording medium" may also include those that maintain the program dynamically for a short period of time as a communication link when transmitting a program via a network such as the Internet and the like or a communication line such as a telephone line and the like, and that maintain the program for a fixed period of time such as a volatile memory inside the computer system serving as a server or a client in the case. Also, the program may be one for implementing part of the above function, one that can implement the above function in combination with a program already recorded in a computer system, or one that is implemented using FPGAs (Field Programmable Gate Arrays) or the like.

Although embodiments of the invention have been described in detail with reference to the accompanying drawings, concrete configurations are not limited to these embodiments, but include other designs or the like within the scope not departing from the gist of the present invention.

It should be noted that the operations, procedures, steps, and stages of each process performed by an apparatus, system, program, and method shown in the claims, specification, or drawings can be performed in any order as long as the order is not indicated by "earlier," "prior to," or the like and as long as the output from a previous process is not used in a later process. Even if the flow of operations is described using phrases such as "first" or "next" in the claims, specification, or drawings for convenience, it does not necessarily mean that the operations must be performed in this order.

DESCRIPTION OF REFERENCE NUMERALS 1 scanning probe microscope
2 cantilever
5 movement driving unit
6 displacement detection unit
7 control device
42 contact determination unit
43 driving unit
44 measuring unit
421 first determination unit
422 second determination unit

What is claimed is:

1. A scanning probe microscope for scanning a surface of a sample with a probe by bringing the probe into contact with the surface of the sample, comprising
    a cantilever having the probe at its tip;
    a displacement detection unit to detect both a bending amount and a torsion amount of the cantilever;
    a contact determination unit to determine a primary contact of the probe with the surface of the sample, based on the bending amount and the torsion amount detected by the displacement detection unit in all directions from an undeformed condition of the cantilever;
    a measuring unit to measure a relative distance that is a distance by which one of the probe and the surface of the sample is forced to move relative to the other when they are forced to bring into contact with each other;
    a movement driving unit to move the probe backwards in a direction away from the sample and to move it to a next measurement position of the sample after the relative distance has been measured by the measuring unit; and
    a calculation unit to calculate a distance by which the probe is moved backwards in the direction away from the sample, based on the bending amount and the torsion amount; and
    wherein the movement driving unit includes, a XY scanner which, after said backwards movement, moves the probe to a before-lowering position for measurement which is positioned directly above the next measurement position and which is not brought into contact with the probe, and a Z-direction driving device which lowers the probe from the before-lowering position for measurement to the next measurement position.

2. The scanning probe microscope according to claim 1, wherein the contact determination unit determines that the probe has been brought into contact with the surface of the sample when at least one of the bending amount and the torsion amount exceeds a predetermined range.

3. The scanning probe microscope according to claim 2, further comprising a movement driving unit for scanning with the probe, wherein the movement driving unit is configured to control one of the bending amount and the torsion amount detected by the displacement detection unit to be maintained within boundary values, and to control the other amount to be maintained within the predetermined range.

4. A method of detecting a probe contact of a scanning probe microscope for scanning a surface of a sample with a probe by bringing the probe into contact with the surface of the sample, comprising
    a displacement detection step of detecting both a bending amount and a torsion amount of a cantilever having the probe at its tip;
    a contact determination step of determining a primary contact of the probe with the surface of the sample, based on the bending amount and the torsion amount detected by the displacement detection step in all directions from an undeformed condition of the cantilever;
    a measuring step of measuring a relative distance that is a distance by which one of the probe and the surface of the sample is forced to move relative to the other when they are forced to bring into contact with each other;
    a backward moving step of calculating a distance by which the probe is moved backwards in the direction away from the sample, based on the bending amount and the torsion amount, and moving the probe backwards in a direction away from the sample; and
    a moving step of moving the probe to a next measurement position of the sample after the relative distance has been measured by the measuring unit, wherein after said backwards moving step, a XY scanner moves the probe to a before-lowering position for measurement which is positioned directly above the next measurement position and which is not brought into contact with the probe, and a Z-direction driving device lowers the probe from the before-lowering position for measurement to the next measurement position.

* * * * *